3,849,471
PROCESS FOR REACTING WEAK ACIDS WITH CHLOROALKYL SUBSTITUTED SILICON COMPOUNDS
George M. Omietanski and Herbert E. Petty, Marietta, Ohio, assignors to Union Carbide Corporation, New York, N.Y.
No Drawing. Filed Dec. 14, 1972, Ser. No. 314,978
Int. Cl. C07f 7/08, 7/10, 7/18
U.S. Cl. 260—448.2 E          8 Claims

ABSTRACT OF THE DISCLOSURE

The process of reacting a weak acid with a chloroalkyl substituted silicon compound in the presence of ethylenediamine to form organofunctional silicon compounds.

---

This invention is concerned with the condensation reaction of a weak acid with a chloroalkyl substituted silicon compound whereby the donated proton of the acid condenses with the chlorine to form hydrogen chloride and the base component of the acid is added to carbon atoms from which the chlorine is displaced. More particularly, this invention is concerned with the aforementioned condensation reaction which is promoted by the presence of ethylenediamine. In particular, this invention involves the heterogeneous intermixture of a weak acid, ethylene-diamine and a chloroalkyl substituted silicon compound in which the donated proton of the acid forms a hydrogen chloride condensation product by reaction with the chlorine of the chloroalkyl substituted silicon compound, and the base component of the acid is thereupon added to the carbon atom from which the chlorine is displaced.

Chloroalkyl substituted silicon compounds are widely employed in the manufacture of organofunctional silicon compounds. For example, chloropropyl substituted silanes are reacted with ethylenediamine to form a diamino substituted silicon compound which is very useful as a coupling agent for enhancing the bonding of a variety of organic materials to inorganic substrates. The chloroalkyl substituted silicon compounds are also used to form mercapto substituted compounds by the reaction of sodium hydrogen sulfide and chloropropyl silicon compounds.

There is described herein a different utilization of chloroalkyl substituted silicon compounds which involves displacement of the chlorine by the base component of a weak acid and the displaced chlorine reacts with the donated proton of the acid to form hydrogen chloride. All of this can be accomplished in good yields, at reasonably moderate temperature conditions, at relatively low pressures and within short reaction periods. A significant factor of this invention is that the above is achieved even though the chloroalkyl substituted silicon compound is principally immiscible in the reaction medium.

This reaction involves intermixing a chloroalkyl substituted silicon compound as one liquid phase with ethylenediamine in admixture with a weak acid as the second liquid phase whereby the two phases contact such that an amount of the ethylenediamine, in association with weak acid, is solubilized within the chloroalkyl substituted silicon compound liquid phase to the level of solubility that it possesses in that phase. The single phase solution of the chloroalkyl substituted silicon compound and ethylenediamine mixed with the weak acid can be also effected by dissolution of the chloroalkyl substituted silicon compound in the ethylenediamine-weak acid liquid phase to the extent of its solubility in that phase. Eventually, during the course of the reaction, one phase is predominantly the reaction product and the other phase is predominantly ethylenediamine-hydrogen chloride salt, ethylenediamine and unreacted weak acid. Those two liquid phases can thereafter be easily separated by simple liquid decantation thereby providing a very convenient method of producing substituted organosilicon compounds wherein the substitution is derived from the base component of a weak acid.

An acid, as defined in this specification and is covered by the claims, is a chemical which is an acid in accordance with the Brönsted theory of acids and bases, see page 143 of Frey, "College Chemistry," Second Edition, Prentice-Hall, Inc., Englewood Cliffs, New Jersey, U.S.A. A "weak acid," on this same basis, is an acid which has a dissociation constant, determined as the negative log thereof, pK, ranging from as low as about 2 to as high as about 13, determined in water at 25° C. Illustrative of weak acids are the inorganic and organic acids such as, for example, hydrogen sulfide, hydrogen disulfide, hydrogen cyanide, boric acid, thiocyanic acid, alkyl and aryl mercaptans, alkylene polymercaptans, aryl alkyl mercaptans, cycloalkyl mercaptans, cycloalkyl polymercaptans, acetic acid, acrylic acid, methacrylic acid, adipic acid, phenol, ortho-cresol, meta-resol, para-cresol, citric acid, cinnamic acid, fumaric acid, linoleic acid, the alkyl or aryl acid phosphonates, the alkyl or aryl acid silicates, and the like. The last mentioned phosphonates and silicates are each characterized as possessing hydroxyl groups which are bonded to phosphorus and silicon atoms, respectively. The terms acid and weak acid also include acids whose reactivity is governed by the relative nucleophilicity of their conjugated base, and their operability is predicated not on their pK, see Breslow, "Organic Reaction Mechanisms," published by W. A. Benjamin, Inc., New York, (1965).

The ethylenediamine, the weak acid, and the chloroalkyl silicon compound which are employed are intermixed at temperatures at which all of the components, as utilized within the reaction medium, are liquid. In other words, the reaction conditions selected, in the case where a particular weak acid forms a solid salt at some temperature with ethylenediamine, would be above that temperature when effecting the reaction. By properly selecting the mixture of these compounds, for example, utilizing an excess quantity of EDA, one may suppress that temperature at which one of the components becomes solid. With this working tool as a guide, and recognition that the reaction may be carried out at a temperature ranging from about 0° C. to about 150° C. with utmost convenience utilizing pressure reactors where materials are gaseous under the reaction conditions or utilizing closed reaction vessels where such is obviously necessary, one may select an appropriate mole ratio of the various component to effectively employ the process. From this, and that which follows, it should be appreciated that there is a wide latitude in reaction conditions and mole ratios of reactants that one may employ in practicing the process of this invention.

The chloroalkyl silicon compound is any silicon compound which contains a chloroalkyl radical as a component thereof. The chlorine atom is separated from the silicon atom by at least a methylene radical. Thus, the silicon compound can be a silane which contains bonded thereto the simple chloromethyl radical. On the other hand, it can be a siloxane copolymer having a molecular weight of 1 million or more wherein the chlorine atom is bonded to an organic radical which is silicon bonded and which is an extremely complex structure such as one which is a norbornene derivative. Broadly speaking, the operative practice of this invention involves the reaction of a weak acid, in the presence of ethylenediamine, with a chlorine substituted silicon compound in which the sole limitation of the position of the chlorine atom in the silicon compound is that it be bonded to a methylene group. Another limitation of that compound is that it be liquid when undergoing the reaction. It may be made liquid by dissolving it in a solvent which is not reactive with ethylenediamine or the weak acid, or it may be rendered liquid by heating it to a temperature at which it melts.

Preferred organosilicon compounds which may be utilized in the practice of the process of this invention by those which are characterized by the following formula:

(A)
$$ClCHR_xSi\equiv$$
with $R^1$ above Si wherein R is alkyl of 2 or more carbon atoms in sequence, aryl, alkaryl, aralkyl, alkoxy, aryloxy, alkaryloxy, aralkoxy, alkoxyalkyl, alkoxyaryl, alkoxyalkoxy, alkoxyaryloxy, and the like, $x$ is either 0 or 1, $R^1$ may be hydrogen alkyl, aryl, alkenyl, alkynyl, and the like, and the three valences of the silicon atom may be one or more of alkoxy, aryloxy, oxygen bonded to other silicon atoms whereby to form a siloxane, and organic groups which are bonded to the Si by a carbon to silicon bond.

The most particularly preferred silicon compounds are those which are characterized by the silane of the following formula:

(B)
$$ClCHR_xSiX_{3-n}$$
with $R^1$ and $R^2_n$ above wherein $R^2$ is a monovalent organic group bonded to silicon by a carbon-to-silicon bond and is free of radicals which either react with the weak acid under the reaction conditions or which react with ethylenediamine under the reaction conditions whereby to interfere with the reaction, X is alkoxy or aryloxy, and $n$ is one of 0, 1, 2, or 3; or the siloxane polymers which are characterized by the following formula:

(C)
$$\left[ClCHR_xSiO_{\frac{3-m}{2}}\right]_a \left[R^2_pSiO_{\frac{4-p}{2}}\right]_b$$
with $R^1$ and $R^2_m$ above wherein $m$ is 0, 1 or 2, $p$ is 0, 1, 2 or 3, and $a$ may range from about 1% to about 100% and $b$ may range from about 0% to about 99%, based on the weight of the polymer. In the above formulae, $x$, R, $R^1$, and $R^2$ have the same meanings throughout.

Illustrative of a number of organosilicon compounds encompassed by the above formulae are the following:

$$Cl(CH_2)_3Si(OCH_3)_3$$

$$ClCH_2CHCH_2Si(OCH_3)_3$$
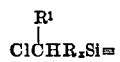

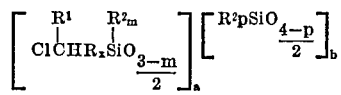

$$(ClCH_2)_4Si \quad ClCH_2Si(CH_3)_3$$

$$ClC(CH_3)_2CH_2CH_2Si(OCH_3)_3$$

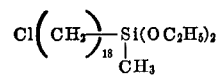

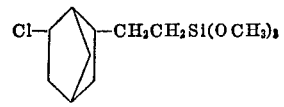

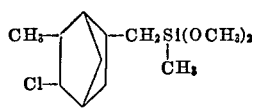

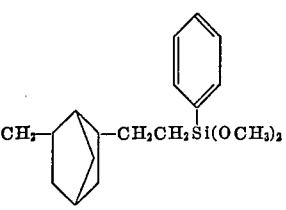

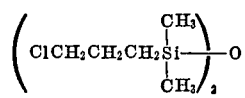

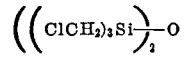

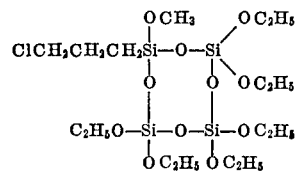

$$ClCH_2CH_2CH_2Si(OCH_2CH_2Cl)_3$$

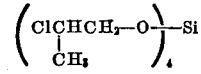

$$HSi(OCH_2CH_2Cl)_3$$

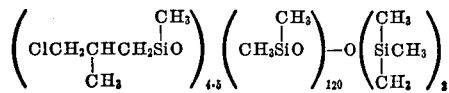

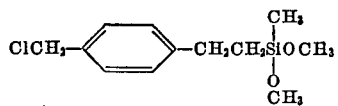

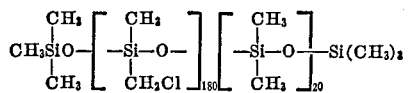

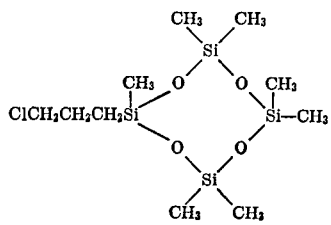

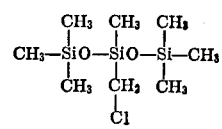

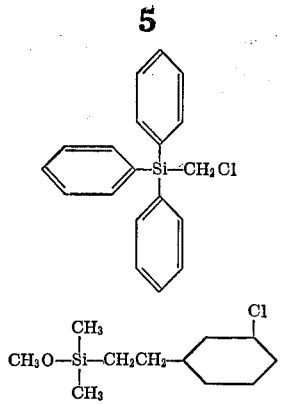

In determining the proportion of the reactants employed in the process of this invention, one should view the reactants on the following basis. Each chloroalkyl group of a chloroalkyl substituted silicon compound, as characterized above, which is employed or present in the reaction constitutes a mole equivalent of the reactant, each mole of ethylenediamine constitutes a mole equivalent of ethylenediamine; and each proton of the acid which is to be donated constitutes a mole equivalent. With this in mind, there should be present at least one mole of ethylenediamine for every proton of the weak acid to be donated, and at least one proton of the acid available for every mole equivalent of chloroalkyl present in the chloroalkyl silicon compound. Since the diamine is an excellent solvent for the weak acid and is a good medium for solvating the weak acid in the non-miscible chloroalkyl substituted silicon compound, it may be utilized in excess of the mole equivalent amounts expressed above. When an excess of ethylenediamine is employed, the reaction is usually facilitated. In fact best reactivities and yields are obtained when extremely large excesses of ethylenediamine are employed in the reaction, such as, for example 4 moles of ethylenediamine for every mole of the weak acid. However, though the large excess of the ethylenediamine will enhance the reaction of the weak acid with the chloroalkyl silane, the ethylenediamine itself is capable of entering into reaction with the chloroalkyl silicon compounds to form a diamino substituted alkyl substituted silicon compound. Hence, when such a large excess of ethylenediamine is employed, there is obtained a larger amount of diamino substituted silicon compound as an impurity of the reaction. If this impurity is objectionable, then one may employ a small amount of ethylenediamine relative to the amount of weak acid employed, such that there is a large excess of weak acid available or an amount of weak acid which is equivalent to the mole equivalent of ethylenediamine employed, and these will minimize the amount of the diamine product produced in the reaction.

Important when practicing this embodiment of the invention, that is, using large quantities of the weak acid relative to the amount of ethylenediamine, is the fact that there is a possibility of producing the dihydrogen chloride salt of ethylenediamine. That salt is generally solid in the reaction mixture and must be removed during the course of recovery of the reaction product. This could render the process objectionable if solids removal is considered a serious problem. Hence, the balance one must strike is between utilization of too much ethylenediamine, which creates a diamino byproduct, and too little ethylenediamine, which could create the solid di-hydrogen chloride salt of the ethylenediamine.

The process may be effected in the presence of solvents other than ethylenediamine. If a solvent other than ethylenediamine is considered necessary in order to render one of the components liquid for utilization in the reaction, such as the silicon compound or the weak acid, it is desirable that the solvent be a strong polar liquid such as alkanols, e.g., methanol, ethanol, propanol, isopropanol, methyl Cellosolve (TM), ethyl Cellosolve (TM), sulfoxide solvents such as dimethyl sulfoxide, diethyl sulfoxide, and the like, ether solvents such as methyl ether, ethyl ether, butyl ether, butyl methyl ether, tetrahydrofuran, dioxane, and the like.

The reaction is effected by mixing the three components simultaneously or any two of them together and thereafter adding the third, under agitation sufficient to produce a discontinuous and continuous phase predicted on the volume ratio of one phase to the other. The degree or rate of mixing is a factor in determining the rate of the reaction. All that is required is that a reasonable degree of intermixture of the three reactants be effected. If a moderate degree of mixing is to be employed, it is preferred that the acid and diamine be mixed prior to admixture with the chloroalkyl substituted silicon compound.

The process may be carried out at atmospheric or superatmospheric pressure conditions. If one of the components is gaseous at the reaction temperature, it is possible to carry out the reaction under superatmospheric conditions to enhance the solubilization of that component in the other reactants. However, pressure conditions are not critical to the reaction except to the extent that atmospheric or superatmospheric pressure is preferred because it insures that any vaporizable component at the temperature of the reaction will not be readily withdrawn from the reaction at such a rate as to adversely affect the degree of reaction obtainable.

The following examples are offered solely to illustrate the practice of this invention and are not intended for purposes of restricting the scope of this invention.

The following examples distinguish the use of ethylenediamine as a solvent or reactant carrier over other solvents. In the examples "Me" means methyl, "EDA" means ethylenediamine, and "VPC" means vapor phase chromatography.

EXAMPLES 1 THROUGH 9

Examples 1 through 9, which employ the same procedure, show the following reaction performed at atmospheric pressure:

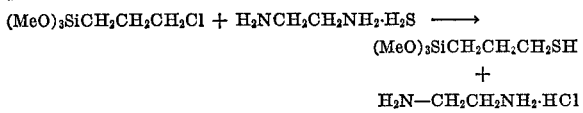

The details of Example 1 are given below. Reaction parameters for the other examples are given in Table 1.

Example 1

Into a tared, 500 ml. flask was added 120 g. (2 moles) ethylenediamine. With stirring, hydrogen sulfide was bubbled into the ethylenediamine at a moderate rate. The temperature of the mixture increased to 90° C. (dependent upon the rate of addition of $H_2S$) and was maintained at 90–95° by adjusting the rate of flow of hydrogen sulfide. The color of the solution changed from pale yellow to bright emerald green with the formation of a small quantity of black precipitate. Hydrogen sulfide addition was saturated (determined by detecting $H_2S$ escaping through a $N_2$ blow-by tube with lead acetate paper). Upon weighing the flask, 39.0 g. (1.1 moles) $H_2S$ had been dissolved. Maintaining the solution at 90°, 99.3 g. (0.5 mole) of γ-chloropropyltrimethoxysilane was quickly added with vigorous agitation. The temperature of the flask increased immediately to 100° C. and slowly decreased back to 90° C. Samples were taken after 20 minutes, 60 minutes, and 120 minutes to monitor reaction completion by VPC analysis. VPC analysis indicated 96.5% conversion to product after 120 minutes. The VPC analysis of the crude product after removing the liquid bottom phase indicated (in area percent) 0.9% methanol, 1.9% ethylene diamine, 3.1% γ-chloropropyltrimethoxysilane, 85.4% γ - mercaptopropyltrimethoxysilane, 5.8% γ-ethylenediaminopropyltrimethoxysilane, can be characterized as gamma(beta - aminoethyl)aminopropyltrimethoxysilane, 0.3% silicon hydrolysis product of γ-mercaptopropyltrimethoxysilane, 1.6% thioether of γ-mercaptopropyltrimethoxysilane and 0.6% heavies. The recovery of crude product was >90% after separation of the ethylenediaminehydrogen chloride (EDA·HCl) phase. Analysis of the bottom phase indicated less than 5% of silicon containing materials were dissolved in the ethylenediamine hydrogen chloride.

γ-ethylenediaminopropyltrimethoxysilane, and 1.7% bis-(trimethoxysilylpropyl) thio ether. The γ-chloropropyltrimethoxysilane to product ratios over the other time intervals are given under entry 10, Table 2.

Example 11

An experiment using 36 wt. percent methanol as the solvent was carried out for comparison to the reaction without solvent (example 10). To 142 g. of EDA·H$_2$S

TABLE 1

| Example | H$_2$S, g. | Ethylene-diamine, g. | Other | Reaction conditions[1] | Ratio of reactant to product[2] | VPC area percent bis (trimethoxysilylpropyl) thioether |
|---|---|---|---|---|---|---|
| 1 | 39 | 120 | | 90° C.[5] After 20 min | 57:8.42.2 | 0.3 |
| | | | | 90° C.[5] After 60 min | 15.8:83.2 | 1.2 |
| | | | | 90° C.[5] After 120 min | 3.5:96.5 | 1.6 |
| 2 | 68 | 240 | | 50° C. After 1.5 hr | 43.2:56.8 | 1.2 |
| | | | | Additional 2.0 hr. at 70° C | 1.7:98.3 | 2.5 |
| 3 | 36 | 120 | | 70° C. After 1 hr | 36.1:63.9 | 2.2 |
| | | | | 70° C. After 2 hr | 19.3:80.7 | 3.4 |
| | | | | 70° C. After 3 hr | 10.3:89.7 | 4.1 |
| 4 | 44 | 120 | | 70° C. After 1.5 hr | 41.6:58.4 | 0.4 |
| | | | | 70° C. After 3.0 hr | 13.7:86.3 | 0.8 |
| | | | | 70° C. After 3.5 hr | 9.4:90.6 | 0.9 |
| 5 | 79 | 240 | | 90° C. (Exotherm to 108° C.). After 20 min | 0.5:99.5 | 1.0 |
| 6 | 62 | 240 | 18 g. HCl[3] | 90° C. (Exotherm to 103° C.). After 20 min | 3.2:96.8 | 0.8 |
| 7 | 44 | [4] 120 | | 90° C. (Exotherm to 117° C.). After 5 min | 0.0:100.0 | 2.8 |
| 8 | 19 | 60 | 64 g. MeOH. | 70° C. After 10 min | 64.0:36.0 | 0.4 |
| | | | | 70° C. After 20 min | 41.5:58.5 | |
| | | | | 70° C. After 40 min | 24.6:75.4 | 3.9 |
| 9 | 19 | 60 | 64 g. MeOH. | 70° C. After 60 min | 17.4:83.6 | 3.9 |
| | | | | 70° C. After 120 min | 6.4:93.6 | 9.3 |
| | | | | 70° C. After 180 min | 3.7:96.3 | 5.7 |

[1] In all examples 99.3 g (0.50 moles) of γ-chloropropyltrimethoxysilane was used.
[2] By comparison of VPC area %. Column: OV-101 (20%, 6 ft.) programmed from 70-350° C. at 10° C. min. Ratio of Reactant to Product = γ-chloropropyltrimethoxysilane to γ-mercaptopropyltrimethoxysilane.
[3] Bottom phase from Example 5. The quantities of H$_2$S and HCl were calculated.
[4] The 99.3 g. of γ-chloropropyltrimethoxysilane were dissolved in an additional 120 g. of ethylenediamine.
[5] (Exotherm to 100° C.).

EXAMPLES 10 THROUGH 12

Details of examples 10 through 12 are described below. Further reaction parameters of those examples are given in Table 2.

Example 10

A standard solution of ethylenediamine hydrogen sulfide complex was prepared by dissolving 630 g. of H$_2$S in 2000 g. of ethylenediamine (EDA). This solution was not a saturated solution and therefore remained a liquid at room temperature (about 23° C.). The calculated amount of H$_2$S=24 wt. percent; the sample was titrated with AgNO$_3$ at 23.5 wt. percent H$_2$S. This solution was stable at room temperature. Even after repeatedly opening the bottle in which the complex was contained, the percent H$_2$S was unchanged after 6 weeks.

To 142 g. of the above EDA·H$_2$S solution (108 g., 1.8 moles, EDA+34 g., 1.0 mole, H$_2$S) in a 500 ml. flask maintained at 70° C. in a constant temperature bath were quickly added 99.3 g. (0.5 mole) of γ-chloropropyltrimethoxysilane with vigorous agitation. The temperature of the reaction mixture increased to 76° C. over a 10 minute period. Samples were taken periodically to monitor the extent of the reaction by VPC analysis. After 360 minutes at 70° C. the agitation was stopped and the phases allowed to separate. Decantation of the liquid bottom phase left the top product phase which showed after VPC analysis 1.4% methanol, 5.3% EDA, 0.9% γ-chloropropyltrimethoxysilane, 76.0% γ-mercaptopropyltrimethoxysilane (Ratio of Reactant to Product=1.2:98.8) 6.6%

(containing 108 g. EDA and 34 g. H$_2$S) were added 75 g. methanol. The resulting solution was heated to 70° C. in a constant temperature bath and 99.3 g. of γ-chloropropyltrimethoxysilane were quickly added to this solution with agitation. The mixture, sampled after 15 minutes, indicated that the reaction had proceeded to an extent of 85% completion. The reaction was complete in less than 180 minutes. VPC analysis of the top phase of the crude product after 180 min. indicated (in area percent) 16.5% methanol, 2.1% EDA, 0.0% γ-chloropropyltrimethoxysilane, 70.6% γ-mercaptopropyltrimethoxysilane, 3.0% γ-ethylenediaminopropyltrimethoxysilane, and 3.0% bis(trimethoxysilylpropyl)thioether. The reaction mixture was heated to 90° C., distilling 65 g. of methanol, leaving 122.2 g. of reaction mixture. Analysis of the product phase (102 g.) indicated (in area percent) 9.4% methanol, 28.9% EDA, 0.0% γ-chloropropyltrimethoxysilane, 47.4% γ-mercaptopropyltrimethoxysilane, 3.5% γ-ethylenediaminopropyltrimethoxy silane, 6.1% 2 silicon ester of γ-mercaptopropyltrimethoxysilane, 1.5% bis(trimethoxysilylpropyl)thioether. The EDA·HCl phase (123 g.) contained 14.6% HCl and 10% H$_2$S.

Example 12

Substituting dimethylformamide at 12 wt. percent for methanol under identical reaction conditions to example 10 gave after 60 minutes at 70° C. by VPC analysis (in area percent 4.1% methanol, 5.0% EDA, 3.7% γ-chloropropyltrimethoxysilane, 66.6% γ-mercaptopropyltrimethoxysilane (Reactant to Product=5.3:94.7), 4.1% γ-dimethylaminopropyltrimethoxysilane, 0.6% γ-ethylenediaminopropyltrimethoxysilane, 4.4% 2 silicon ester of γ-mercaptopropyltrimethoxysilane, and 9.2% bis(trimethoxysilylpropyl)thioether.

Example 26

To 120 g. of ethylenediamine containing 34 g. (1.0 mole) of $H_2S$ in a 500 ml. 3-necked flask were slowly added 32 g. (1.0 mole) of sulfur at 30° C. Upon addition of sulfur the temperature increased and the reaction mixture

TABLE 2

| Example | $H_2S$, g. | Ethylene-diamine, g. | Other, g. | Reaction conditions [1] | Ratio of reactant to product [2] | VPC area percent, bis (trimethoxysilylpropyl) thioether |
|---|---|---|---|---|---|---|
| 10 | 34 | 108 | | 70° C., after 5 min | 92.3:7.7 | Trace |
|  |  |  |  | 70° C., after 15 min | 71.3:28.7 | 0.2 |
|  |  |  |  | 70° C., after 30 min | 46.5:53.5 | 0.3 |
|  |  |  |  | 70° C., after 60 min | 28.6:71.4 | 0.8 |
|  |  |  |  | 70° C., after 120 min | 11.9:88.1 | 1.2 |
|  |  |  |  | 70° C., after 180 min | 7.5:92.5 | 1.4 |
|  |  |  |  | 70° C., after 240 min | 3.0:97.0 | 1.6 |
|  |  |  |  | 70° C., after 360 min | 1.2:98.8 | 1.7 |
| 11 | 34 | 108 | MeOH, 75 | 70° C., after 15 min | 15.1:84.9 | 1.0 |
|  |  |  |  | 70° C., after 180 min | [4] |  |
|  |  |  |  | 70° C., after MeOH removal | [4] | 1.5 |
| 12 | 34 | 108 | DMF,[3] 24 | 70° C.,[5] after 5 min | 84.2:15.8 |  |
|  |  |  |  | 70° C.,[5] after 15 min | 32.8:67.2 | 1.5 |
|  |  |  |  | 70° C.,[5] after 60 min | 5.3:94.7 | 9.2 |

[1] In all examples 99.3 g. (0.50 moles) γ-chloropropyltrimethoxysilane was used.
[2] By comparison of VPC area percent. Column: OV-101 (20%, 6 ft.) programmed from 70-350° C. at 10° C./min. Ratio of reactant to product= γ-chloropropyltrimethoxysilane to γ-mercaptopropyltrimethoxysilane
[3] DMF=dimethylformamide.
[4] Total conversion.
[5] Exotherm to 85° C.

Examples 13 to 25

The use of ethylenediamine as a hydrogen sulfide carrier for displacement reactions is given in the following examples. The description given in Example 13 is followed for the other examples. All examples are summarized in Table 3. Examples 22–25 compare the efficiency of other amines, tributylamine, pyridine and diethylenetriamine (DETA) with EDA. The use of polar solvent, methanol, in Examples 16–22 accelerate the reaction rate by increasing the solubility of the EDA·$H_2S$ complex in the reactant phase.

Example 13

Into a Parr hydrogenation bottle were added 108 g. (1.8 mole) EDA. The bottle was stoppered, heated to 70° C. with a circulating thermostatted oil bath, and pressurized to 40 p.s.i. with hydrogen sulfide with agitation from the shaker device of the Parr apparatus. After 1 hour, the pressure was released, the bottle unstoppered, and 99.3 g. of γ-chloropropyltrimethoxysilane was added. The bottle was repressurized to 40 p.s.i. $H_2S$ pressure and agitation was continued at 70° C. The temperature inside the bottle increased to 85° C., which slowly dissipated. After 2 hours, the contents of the bottle were sampled for VPC analysis. The bottom phase of the reaction mixture (EDA·$H_2S$ and EDA·HCl) quickly solidified upon cooling. VPC analysis of the top phase indicated (in area percent) 1.7% $H_2S$, 0.7% methanol, 0.0% EDA, 42.4% γ-chloropropyltrimethoxysilane, 48.6% γ-mercaptopropyltrimethoxysilane (Reactant to product=46.5:53.5), 0.1% γ-ethylenediaminopropyltrimethoxysilane, trace amounts of 2 silicon ester of γ-mercaptopropyltrimethoxy silane and bis(trimethoxysilylpropyl) thioether.

turned deep orange-red in color. After all of the sulfur had dissolved, the reaction was heated to 90° C. and 99.3 g. (0.5 mole) of γ-chloropropyltrimethoxysilane was added. The reaction mixture was vigorously agitated for 3 hours at 90° C. Upon standing a colorless phase separated to the top. Analysis of this phase indicated an 8:92 mixture of γ-mercaptopropyltrimethoxysilane to bis(γ-trimethoxysilylpropyl) disulfide. The composition of the disulfide, purified by VPC collection, was confirmed by Raman and Mass Spectroscopy.

Example 27

Hydrogen cyanide was carefully bubbled into 120 g. (2.0 moles) EDA with the liberation of heat. No attempt was made to determine the concentration of HCN in the EDA (the solution was not saturated with HCN). To this solution was added dropwise 99.3 g. (0.5 moles) of γ-chloropropyltrimethoxysilane. Again an exothermic reaction ensued. The temperature was maintained at about 70° C. for 3 hours with vigorous agitation of the reaction mixture. Upon standing two phases separated VPC analysis of the top phase indicated three products were formed in the ratio (in order of elution) of 24:31:45. The first product was identified as $(MeO)_3SiCH_2CH_2CH_2CN$, with characteristic absorptions; 4.42 (CN), 8.42 (C—O) and 9.2μ (SiO). The second product was identified as γ-ethylenediaminopropyltrimethoxysilane by comparison of the IR spectrum with that of an authentic sample. The third product was identified as γ-(2-imidazolin-2-yl)propyltrimethoxysilane by IR, 6.24μ (C=N) and N.M.R. spectroscopy.

Though the foregoing describes this invention with respect to a plurality of details, it is not intended that the

TABLE 3

| Example | $H_2S$ (press.) p.s.i. | Amine, g. | Other, g. | Reaction conditions [1] | Ratio of reactant to product [2] | VPC area percent, bis-(trimethoxysilylpropyl)-thioether |
|---|---|---|---|---|---|---|
| 13 | 40 | EDA, 108 | | 70° C. (exotherm to 90° C.) after 120 min | 46.5:53.5 | Trace |
| 14 | 40 | EDA, 108 | | 70° C. (exotherm to 85° C.) after 360 min | 34.4:65.5 | Trace |
| 15 | 40 | EDA, 108 | | 70° C., after 65 hr | 0.4:99.6 |  |
| 16 | 40 | EDA, 33 | MeOH, 75 | 70° C., after 180 min | 6.7:93.3 | 0.2 |
| 17 | 5 | EDA, 33 | MeOH, 40 | 65° C., after 300 min | 47.0:53.0 | 0.1 |
| 18 | 5 | EDA, 33 | MeOH, 40 | 65° C., after 24 hr | 2.6:97.4 | 0.6 |
| 19 | 5 | EDA, 33 | MeOH, 40 KI, 1 | 65° C., after 300 min | 31.2:68.8 | 0.7 |
| 20 | 5 | EDA, 33 | MeOH, 66 | do | 22.2:77.8 | 1.1 |
| 21 | 5 | EDA, 33 | MeOH, 40 C.S.[3], 2 | do | 38.7:61.3 | 0.4 |
| 22 | 5 | $Bu_3N$, 139.1 | | do | 99.5:0.5 |  |
| 23 | | $Bu_3N$, 139.1 | DMF, 48 | 65° C., additional 300 min | 95.4:4.6 |  |
| 24 | 5 | Pyridine, 119 | | 65° C., after 300 min | 99.0:1.0 |  |
| 25 | 5 | DETA, 56.7 | | do | 99.5:0.5 |  |

[1] In all examples 99.3 g. (0.50 mole) γ-chloropropyltrimethoxysilane was used.
[2] By comparison of VPC area percent. Column: OV-101 (20%, 6 ft.) programmed from 70-350° C. at 10° C./min. Ratio of reactant to product= γ-chloropropyltrimethoxysilane to γ-mercaptopropyltrimethoxysilane.
[3] Cationic surfactant.
[4] N,N-dimethylformamide.

invention shall be restricted by them except to the extent that they are provided in the claims.

What is claimed is:

1. The process which comprises reacting in the liquid phase a weak acid having a dissociation constant, determined as the negative log thereof, ranging from as low as about 2 to as high as about 13, determined in water at 25° C. with a chloroalkyl substituted silicon compound in the presence of ethylene diamine.

2. The process of claim 1 wherein the reactants form a heterogeneous mixture.

3. The process of claim 2 wherein the heterogeneous mixture has two phases, one containing a soluble salt of the weak acid with ethylene diamine and the other containing the chloroalkyl substituted silicon compound.

4. The process of claim 3 wherein ethylene diamine in the reaction forms a soluble hydrogen chloride salt.

5. The process of claim 4 wherein the weak acid is one of hydrogen sulfide, hydrogen disulfide or hydrogen cyanide.

6. The process of claim 5 wherein the reaction is effected at a temperature ranging from about 0° C. to about 150° C.

7. The process of claim 6 wherein the chloroalkyl substituted silicon compound is a chloroalkyl alkoxy or aryloxy silane.

8. The process of claim 7 wherein the silane is gamma-chloropropyl alkoxy silane.

References Cited

UNITED STATES PATENTS 3,297,735   1/1967   Simmler _____ 260—448.2 E

OTHER REFERENCES

Noll, "Chemistry and Technology of Silicones," Academic Press, New York (1968), p. 158.

DANIEL E. WYMAN, Primary Examiner

P. F. SHAVER, Assistant Examiner

U.S. Cl. X.R.

260—448.8 R

UNITED STATES PATENT OFFICE
CERTIFICATE OF CORRECTION

Patent No. 3,849,471   Dated November 19, 1974

Inventor(s)  George M. Omietanski and Herbert E. Petty

It is certified that error appears in the above-identified patent and that said Letters Patent are hereby corrected as shown below:

Column 2, line 14, "is" should read -- as --.
Column 2, line 59, "component" should read -- components --.
Column 6, line 61, after "was" insert -- maintained until the solution was --.
Columns 7 and 8, Table 1, Example 1, column heading "Ratio of reactant to product$^2$", first figures, "57:8.42.2" should read -- 57.8:42.2 --.
Columns 7 and 8, Table 1, Example 9, column heading "Ratio of reactant to product$^2$", first figures, "17.4:83.6" should read -- 17.4:82.6 --.
Column 8, line 67, "10%" should read -- 1.0% --.

Signed and sealed this 22nd day of April 1975.

(SEAL)
Attest:

RUTH C. MASON
Attesting Officer

C. MARSHALL DANN
Commissioner of Patents
and Trademarks